United States Patent

[11] 3,578,942

| | | |
|---|---|---|
| [72] | Inventor | Leonard J. Bugaj<br>Dearborn, Mich. |
| [21] | Appl. No. | 866,352 |
| [22] | Filed | Oct. 14, 1969 |
| [45] | Patented | May 18, 1971 |
| [73] | Assignee | Ford Motor Company<br>Dearborn, Mich.<br>Continuation-in-part of application Ser. No. 769,785, Oct. 23, 1968, now Patent No. 3,525,848. |

[54] WELDING ELECTRODE ASSEMBLY
7 Claims, 2 Drawing Figs.

[52] U.S. Cl................................................ 219/119, 219/110
[51] Int. Cl...................................................... B23k 9/24, B23k 11/30
[50] Field of Search............................................ 219/109, 110, 119

[56] References Cited
UNITED STATES PATENTS

| | | | |
|---|---|---|---|
| 2,104,749 | 1/1938 | Jones............................ | 219/110 |
| 2,370,009 | 2/1945 | Clark et al..................... | 219/110 |
| 2,104,749 | 1/1938 | Jones............................ | 219/110 |
| 2,370,009 | 2/1945 | Clark et al..................... | 219/110 |

*Primary Examiner*—J. V. Truhe
*Assistant Examiner*—Lawrence A. Rouse
*Attorneys*—John R. Faulkner and William E. Johnson ABSTRACT: A welding electrode assembly includes a metal-welding electrode and a voltage-sensing wire welded at one end to the lower portion of the electrode. A layer of insulating material is positioned between the wire and the electrode along at least the portion of the wire which extends along the surface of the electrode. A layer of nonconductive material is placed over the outer surface of the electrode and the wire. A thin layer of conductive paint is placed over the nonconductive material layer. A layer of electrodeposited material is placed on the layer of conductive material. The electrodeposited material is formed from a material highly resistant to scratching and marring when engaged by sharp edges of metal articles.

Patented May 18, 1971

3,578,942

INVENTOR.
LEONARD J. BUGAJ
BY John R. Faulkner
William E. Johnson
ATTORNEYS

WELDING ELECTRODE ASSEMBLY

This application is a continuation-in-part of applicant's earlier filed application, Ser. No. 769,785 filed Oct. 23, 1968, now U.S. Pat. No. 3,525,848.

BACKGROUND OF THE INVENTION

In recent years, the voltage across a weld being formed in a resistance welding operation has been monitored during each welding cycle for control purposes. This voltage has been monitored by voltage sensing wires attached to the two resistance welding electrodes at a position closely adjacent the weld which is being formed. During the welding operation, the voltage across the weld is integrated with the current flow to obtain an electrical resistance value. The voltage-sensing wires detect the voltage across the weld during the welding operation. It is known that if a definite, but in most cases 15 percent, drop occurs from the maximum resistance value measured during the welding operation, the weld formed in the welding operation will be generally of proper metallurgical characteristics. By thus measuring and correlating the change in resistance or voltage across the weld during the welding operation, a welding machine control may reject or accept the article welded immediately after the welding operation has been performed thereupon.

In prior practice, the voltage-sensing wires of welding electrodes have been imbedded in a notched out portion of the welding electrode. The notch in the welding electrode which received the wire often weakened the welding electrode causing the electrode to be overstressed in operation. This overstressing resulted in early fatigue failures and substantially increased costs with respect to the utilization of such welding electrodes with voltage-sensing wires therein. Another disadvantage of this type of electrode was that the notch had to be machined in each different electrode in a special manner thus increasing the cost of fabrication of such electrodes.

SUMMARY OF THE INVENTION

This invention relates to a welding electrode assembly and, more particularly, to a welding electrode assembly which includes a voltage-sensing wire attached to a welding electrode at a position closely adjacent the point at which the electrode performs a welding operation.

In greater detail, the welding electrode assembly of this invention includes a metal-welding electrode and a voltage-sensing wire bonded at one end to the lower portion of the electrode. The bond formed between the wire and the electrode provides an electrical junction therebetween. A layer of insulating material is placed between the wire and the electrode along the length of the wire extending along the electrode. A layer of nonconductive material is placed on the outer surface of both the electrode and the wire. A thin layer of conductive paint is placed on the layer of nonconductive material and a layer of electrodeposited material is placed on the layer of conductive paint. The electrodeposited layer is formed from a material highly resistant to scratching and marring when engaged by sharp edges of metal articles.

By providing the electrodeposited material, both the voltage-sensing wire and the metal electrode included in the welding electrode assembly are protected. In particular, both the wire and the electrode are protected from being cut or otherwise damaged by engagement thereof by sharp edges of metal articles to be welded.

DESCRIPTION OF THE PREFERRED EMBODIMENT

In the resistance welding of metal stampings such as the welding of body members necessary to construct an automobile, the welding electrode sometimes has to be inserted through an opening in one of the stampings prior to the performance of the welding operation. The electrode is generally engaged by the sharp edges of the stamping into which it is inserted. The electrode must be electrically insulated so that if it contacts a sharp edge of one of the stampings to be welded during the welding operation, no short circuit conditions will exist.

In recent times, it has been found that it is desirable to be able to sense the voltage between the welding electrodes during the welding cycle at a position near the weld being formed. The purpose of sensing the voltage is to determine if the weld formed in the welding operation is a proper one. If an approximate 15 percent resistance drop is experienced across the welded joint from the maximum value measured during the welding operation, the weld so formed is most generally of an accepted quality.

The welding electrode assembly of this invention is designed so that a voltage-sensing wire may be bonded or welded to a welding electrode at a position closely adjacent the position at which the electrode forms the weld. Both the voltage-sensing wire and the welding electrode of the welding electrode assembly have a special covering to protect them from rapid deterioration by engagement thereof with sharp edges of the metal articles to be welded.

Figure 1:
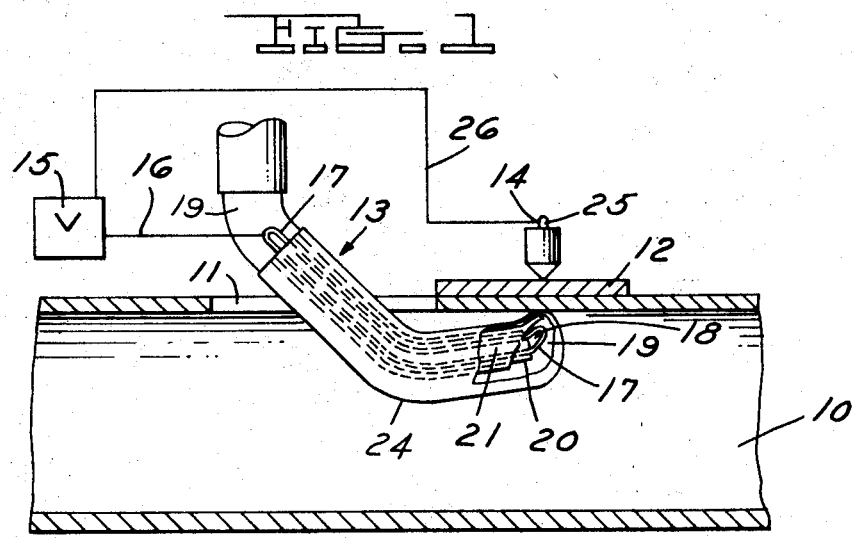
FIG. 1 is a schematic view of a welding electrode assembly formed in accordance with the teachings of this invention.

The welding electrode assembly of this invention will be understood best by reference to FIG. 1. In FIG. 1, there is shown a first channel stamping or member 10 having an aperture 11 therein. In order to resistance weld a second stamping or member 12 to the first stamping, it is necessary to insert a resistance welding electrode 13 through the aperture 11 to engage a portion of the first stamping. A second welding electrode 14 is positioned on the second stamping and clamping pressure is applied to the two electrodes. The resistance welding operation is then carried out to bond the two members together.

In a preferred operation of the resistance welding apparatus, each of the electrodes 13 and 14 is formed of copper metal and is water cooled. The welding electrode generally carries a current load from 8,000 up to 25,000 amps at up to 30 volts, and the electrode operates in a temperature range from 70° to 150° F.

In order to control the welding operation and to measure the voltage drop or voltage across the weld during the welding operation, a voltage-measuring device 15 is provided which is connected by a lead 16 to a voltage-sensing wire 17. As best seen in FIG. 1, the voltage-sensing wire is formed by a flat strip of copper metal which is metallurgically bonded at its lower end 18 to a copper core 19 of the welding electrode 13. Except for the portion of the wire 18 bonded to the core, the remaining portion of the wire is insulated from the core 19 by means of a piece of epoxy impregnated, fiber glass cloth 20. This cloth is positioned between the wire and the core along the length of the wire from its point of weld to the core to the position at which the lead 16 is connected thereto. In a preferred embodiment, a second epoxy impregnated, glass cloth 21 overlines and protects the voltage-sensing wire 17 from one end thereof to the point where the lead 16 is attached to the wire.

Figure 2:
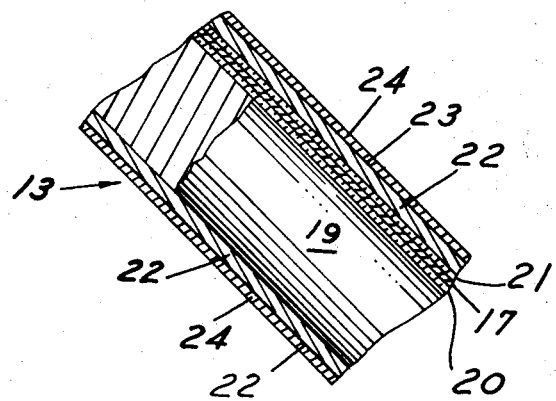
FIG. 2 is a schematic view showing the structural details of the welding electrode assembly of FIG. 1.

In order to protect the voltage-sensing wire 17 and the metal core 19 of the welding electrode 13 from engagement with the sharp edges of metallic articles, additional materials are placed over the welding electrode assembly. The welding electrode 13 is protected in the following manner. With reference to FIG. 2 of the drawings, the welding electrode is formed with the inner copper core 19. In accordance with the specific teachings of this invention, a nonconductive material layer 22 of a thickness from 0.003 to 0.045 inch is placed completely around the outer surface of the copper core and the voltage-sensing wire except for a small area at the tip thereof to permit current flow from the work piece to the sensing wire. This layer of nonconductive material is of such a thickness that the layer has a substantially infinite resistance at a potential of 500 volts DC.

The intermediate, nonconductive layer 22 may be formed on the core 19 by any one of several procedures. In a first procedure, a nylon material may be brushed onto the surface of the copper core and thereafter baked to cure the same. In an alternate procedure, an industrial adhesive, such as industrial adhesive A1150 B, may be applied to the copper core by dipping and thereafter cured to form a hard, nonconductive layer. In another procedure, a polyvinyl chloride plastic can be brushed on the copper core and thereafter cured.

After the immediate, nonconductive layer 22 is placed about the core, the outer surface of this layer is coated with an electrically conductive material 23. For example, the outer surface of the layer may be sprayed with an electrically conductive paint. A silver-containing lacquer such as that known by the name of Ecco Coat CC2 produced by Emerson & Cummings, Inc., Canton, Mass., may be applied in a thin coat to the outer surface of the nonconductive material 22.

In an alternate manner of achieving the thin coat or conductive coat or layer 23 could be in an operation where the nonconductive layer 22 is initially etched in a $CrO_3$-$H_2SO_4$-$H_3PO_4$ bath and then treated with a solution containing palladium chloride. The palladium chloride is thereby occluded on the nonconductive coating. In a subsequent electroless nickel plating operation, nickel is then deposited with the palladium chloride acting as the catalyst of reaction. The nickel then forms a thin coating or layer of conductive material about the nonconductive coating 22.

Once a conductive layer 23 is formed on the nonconductive layer 22, this layer 23 may serve as an electrode for an electroplating operation. In an electroplating operation, a nickel strike is initially placed on the layer 23 and a full nickel layer 24 is plated onto the electrode to a thickness from 0.010 to 0.060 inch. The nickel plate 24 thereafter provides a hard, scratch resistant surface layer which is not abraded by the action of the sharp edges of metal articles thereon. The insulation layer 22 provides a breakdown resistance for the electrode 13 of at least 500 volts DC so there is no shorting out of the electrode through the stampings 10 or 12 during a welding operation.

The nickel-plating operation may take place from a conventional electroplating bath with a composition such as 40 oz. per gallon nickel sulfate, 8 oz. per gallon nickel chloride and 5.5 oz. per gallon boric acid. The plating operation is carried out with a pH of 3.5 to 4, and a voltage of 6 volts, with current density of 50 amps per sq. ft. and a bath temperature of 140° F.

As a substitute for or a supplement to the nickel plate operation, a hard chrome plate may be placed on the nonconductive layer to provide the wear resistant surface layer 24. In such a case, the chrome-plating bath would have a basic composition of about 40 oz. per gallon chromic acid and 0.4 oz. per gallon of sulfuric acid and would operate at a current density of 150 amps per sq. ft. and at a bath temperature of 130° F.

The welding electrode 14 also has a voltage-sensing wire attached thereto and protected as is the voltage-sensing wire 17 of the electrode 13. The voltage-sensing wire 25 of the electrode 14 is connected to the voltage-measuring device 15 by a lead 26. By providing the voltage sensing wires on each side of the weld, a signal is developed in the voltage-sensing device which can be utilized to control the acceptance or rejection of the article being produced in the welding operation.

The welding electrode assembly formed in accordance with the teachings of this invention is one which includes therein a voltage-sensing wire for sensing and indicating whether a proper weld has been formed by the electrode. The sensing wire and the welding electrode are both protected from rapid deterioration through engagements of sharp objects therewith by the utilization of a wear resistant metal plating thereover.

I claim:
1. A welding electrode assembly including:
    a metal-welding electrode;
    a voltage-sensing wire bonded at one end to the lower portion of said electrode, said bond being such as to form an electrical junction between said wire and said electrode;
    a layer of insulating material between said wire and said electrode along at least a portion of the length of said wire which extends along the length of said electrode;
    a layer of nonconductive material on the outer surface of said electrode and said wire;
    a thin layer of conductive paint on said layer of nonconductive material; and
    a layer of electrodeposited material on said layer of conductive material, said electrodeposited layer being formed of a material highly resistant to scratching and marring when engaged by sharp edges of metal articles.

2. The welding electrode assembly of claim 1 wherein: said welding electrode and said voltage-sensing wire are formed of copper.

3. The welding electrode assembly of claim 2 wherein: said layer of electrodeposited material is selected from the group consisting of nickel and chrome.

4. The welding electrode assembly of claim 3 wherein: said nonconductive layer has both a thickness of from 0.010 to 0.060 inch and a substantially infinite resistance at a potential of 500 volts DC.

5. The welding electrode assembly of claim 4 wherein: the layers of electrodeposited materials have a thickness of at least 0.010 inch.

6. The welding electrode assembly of claim 1 wherein: a second layer of insulating material extends over at least a portion of said voltage-sensing wire from the point of its bonding to said electrode to a point spaced from said bonding point.

7. The welding electrode assembly of claim 6 wherein: said first and said second layers of insulating material are fabricated from fiber glass cloth.